United States Patent [19]

Scheinert

[11] Patent Number: 4,633,509
[45] Date of Patent: Dec. 30, 1986

[54] PROCESS FOR SELECTING A CONTROL CHANNEL IN A MOBILE RADIO STATION OF A RADIO TRANSMISSION SYSTEM

[75] Inventor: Stefan Scheinert, Nuremberg, Fed. Rep. of Germany

[73] Assignee: U.S. Philips Corp., New York, N.Y.

[21] Appl. No.: 562,383

[22] Filed: Dec. 16, 1983

[30] Foreign Application Priority Data

Dec. 17, 1982 [DE] Fed. Rep. of Germany ....... 3246741

[51] Int. Cl.$^4$ .............................................. H04B 7/26
[52] U.S. Cl. ...................................... 455/33; 455/38; 455/52; 455/56; 379/60
[58] Field of Search ....................... 455/54, 56, 33, 62, 455/52, 71, 38; 179/2 EB

[56] References Cited

U.S. PATENT DOCUMENTS

| | | | |
|---|---|---|---|
| 4,365,347 | 12/1982 | Otsuka et al. | 455/33 |
| 4,392,242 | 7/1983 | Kai | 455/33 |
| 4,435,840 | 3/1984 | Kojima et al. | 455/33 |

*Primary Examiner*—Marc E. Bookbinder
*Assistant Examiner*—Andrew Telesz

[57] ABSTRACT

To avoid long search times for control channels in a radio transmission system, references to other existing control channels, references to a substitute channel allocated to the base radio station and references by the control channel to itself are transmitted by the base radio station at variable time intervals. The content of such references is at least the channel number allocated to the control channel or the substitute channel.

16 Claims, 1 Drawing Figure

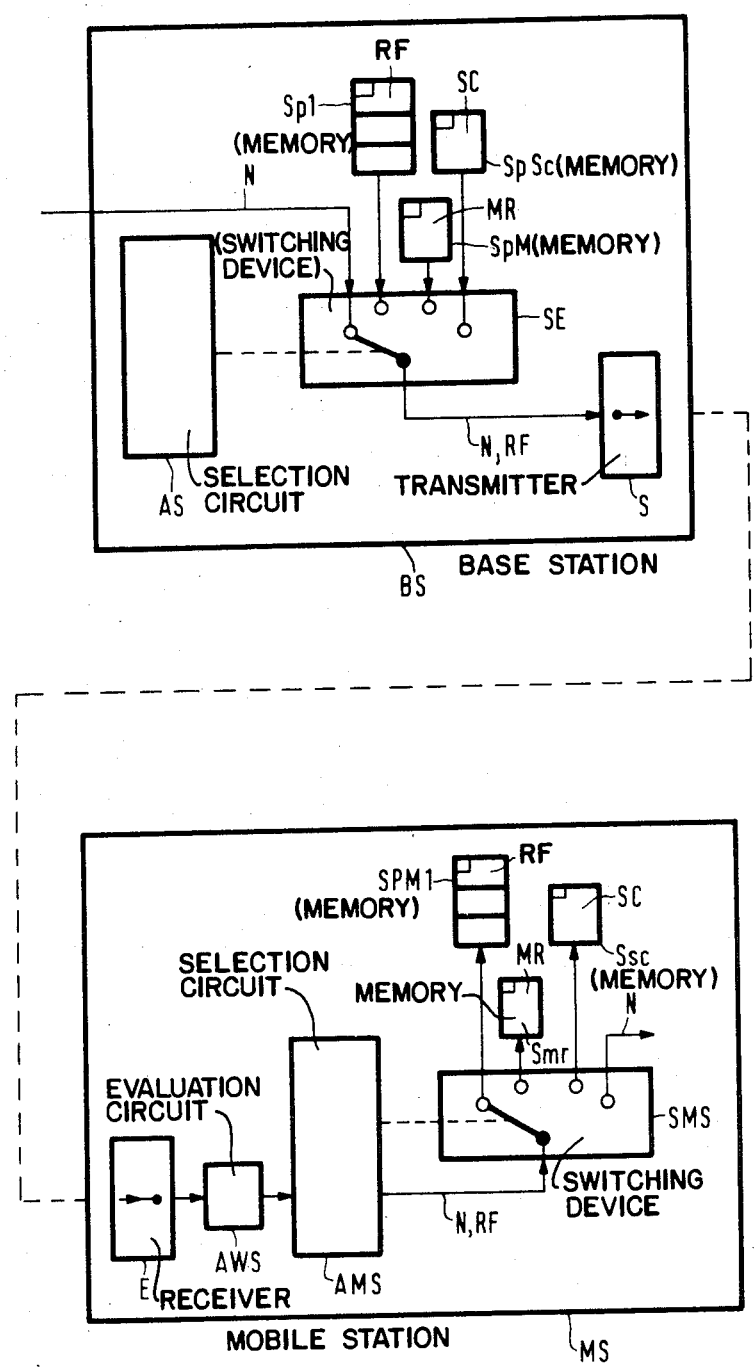

PROCESS FOR SELECTING A CONTROL CHANNEL IN A MOBILE RADIO STATION OF A RADIO TRANSMISSION SYSTEM

BACKGROUND OF THE INVENTION

1. Field of the Invention

The invention concerns a process and apparatus for selecting a control channel in a mobile radio station of a radio transmission system having a plurality of base radio stations to each of which one or more control channels are allocated.

2. Description of the Prior Art

In a radio communication system (radio transmission system) known from Published West German Patent application DE-AS No. 27 33 503 the service area (the entire primary coverage area) is divided up into a large number of zones (radio zones) (cellular system) and each radio zone is allocated at least one control channel (organization channel) and several traffic channels. In a radio zone with a large number of mobile telephone subscribers (mobile radio stations) the transmitter/receiver in each mobile radio station and in the base radio station must access several control channels. To simplify the transmission and reception separation filter, the transmission and reception frequency bonds are each divided into an upper and a lower band and the mobile radio stations are divided up into at least two groups each of which uses one of the transmission and reception frequency bands. The division of the transmission and reception frequency bands into two bands is chosen so that both such groups of mobile radio stations have a common band. The control channels at least are located in this common band. A mobile radio station of a first group selects a control channel, e.g. for the establishment of connections. To this end the mobile radio station scans the control channels allocated to its group for one with a good signal-to-noise ratio. If the signal-to-noise ratio of the selected control channel deteriorates because of interference to the radio field propagation or for some other reason, then the mobile radio station, on receipt of a certain control channel code, can also use a control channel allocated to another group, e.g. the second group. This allocation of control channels of another group is only undertaken in a radio zone which has a small number of mobile radio stations.

In a radio transmission system with a large number of transmission channels, e.g. 1000 transmission channels, this produces the need to place the control channels in a narrow frequency band of the transmission and reception frequency bands. Otherwise the search by the mobile radio stations for a control channel would take a long time.

If the number of control channels in a radio zone belonging to that radio zone or the frequency and consequently the channel number of such a control channel changes, then the mobile radio stations in that zone should automatically and independently assign themselves to the thus formed new set of control channels. If, for example, a new control channel is allocated to the radio zone when one of its control channels fails, then everything possible should be done to prevent the already existing control channels and the new control channel from becoming temporarily overloaded in the short term by a large number of individual transfers of mobile radio stations.

The problem underlying the invention was to devise a process for selecting a control channel in the mobile radio station from among any number of control channels located in the frequency band of the transmission channels. This problem has been solved by the process defined by claim 1.

SUMMARY OF THE INVENTION

In the process according to the invention a control channel can be selected in a mobile radio station largely independently of the number of transmission channels used in the radio transmission system. In a radio transmission system with e.g. 1000 transmission channels the mobile radio station in normal operation monitors e.g. nine control channels. With the introduction of small radio zones (radius 1.5 km) it would take e.g. one minute to monitor all the transmission channels. If the mobile radio station moves at a speed of e.g. 50 km/h in the small cell network, then it is very likely that by the time the monitoring process has been completed the mobile radio station will already have left a small radio zone. Keeping the number of control channels to be monitored low improves the chances of reaching the mobile radio station while it is still in the zone.

When the mobile radio station first switches on it should also be given the opportunity to find a suitable control channel in the course of a search. A change in configuration in the radio transmission system should be possible. Steps should also be taken to ensure that the mobile radio station receives a control channel on the frequency on which the base radio station is transmitting.

This problem has been solved by the process defined by claims 4 and 8.

Image frequency effects are reliably excluded by the transmission of the channel number. Several control channels can be used within a radio zone. A regulated spread of the volume of traffic over the control channels can be achieved with the group code transmitted by the base radio station.

In the event of a control channel failure the mobile radio stations should reassign themselves to a new control channel without rerouting.

This problem has been solved by the process defined in claim 24.

In the radio zones of the adjoining the control channels no sudden increase in the volume of traffic need be expected. The mobile radio stations can be reached again in the shortest possible time on a substitute channel.

DESCRIPTION OF THE DRAWING

The drawing is a block diagram of a radio transmission system showing a base station and a mobile station.

DESCRIPTION OF THE PREFERRED EMBODIMENTS

The invention will now be described in greater detail and explained on the basis of an example.

The radio transmission system is made up of several levels that are built up on top of one another. The lowest level consists of what are known as radio zones. Depending on the height of the aerial masts of the base radio station BS in a zone and with a transmitter power of a maximum of 50 watts the radius of these radio zones can lie between 5 and 15 km. Each radio zone is served by a base radio station BS, which can relay conversations from and to the public telephone network via radio relay equipment. Several adjoining radio zones can be combined into what is known as a paging area. The locations of all the mobile radio stations MS are subject to constant monitoring by the base station where they are stored in an address memory. If a mobile radio station MS changes its paging area, then a change is made in the address memory.

If a telephone subscriber of a public telephone network wishes to contact a mobile radio station MS a selective call is transmitted to all the radio zones of the paging area in which the mobile radio station MS is monitored at that moment.

The transmission and reception frequency band lies, for example, between 860 and 960 MHz. The duplex separation between the transmission and reception frequency bands can be 45 MHz and the transmission and reception frequency bands can be subdivided into channel widths of 25 kHz. The channels are used in duplex operation.

Depending on the volume of traffic the base station of each radio zone of the radio transmission system is allocated a number of traffic channels and at least one control channel CCH. This means that in geographically adjoining radio zones different control channel frequencies are used. To distinguish between a control channel CCH and a traffic channel each of them is given a special code. If a control channel CCH fails or is subject to interference any traffic channel can take over the functions of the control channel CCH by a change in code. In this way it is possible to dispense with the duplication of control channels CCH that would otherwise be necessary for reasons of reliability.

In the above identified known radio transmission system (DE-AS No. 27 33 503) a mobile radio station, once switched on, runs an orientational search for the control channel with the best signal-to-noise ratio. The channel number of this control channel is stored and the mobile radio station goes into a state of rest. The mobile radio station monitors the signal-to-noise ratio of this control channel. If the signal-to-noise ratio of the control channel stored at that moment fails below a given value, then the mobile radio station scans other control channels in a search mode and compares the signal-to-noise ratios. A change in radio zone can be identified by this comparison and the mobile radio station stores the channel number of the corresponding control channel. Accordingly there are mobile radio stations in a radio zone which are ready to transmit and receive or which at a given moment establish connections with the public telephone network or with a mobile radio station of the radio transmission system via the control channel CCH, base radio stations and radio relay equipment. In this prior system the mobile radio station stores the code of the control channel that has the highest signal-to-noise ratio. In this way, according to the traffic situation, the volume of traffic on different control channels of a radio zone may vary.

The conditions and functional procedures for the selection of a control channel CCH by a mobile radio station MS will be described below.

1. Monitoring the state of the network

If the mobile radio station MS is on a particular control channel CCH of a base radio station BS (i.e. receiving its messages) then it checks whether references RF to existing control channels CCH allocated to other base radio stations or reference SC to a substitute channel CCH-SC allocated to the same base radio station BS are relevant to it. For this to be the case a reference control channel must meet the following conditions:

Destination code ("nat"): the destination code (nat) of the control channel CCH must correspond to the one sought by the subscriber in the mobile radio station MS.

Group code ("atp"): the group code (atp) of the a control channel CCH indicates which groups TP of mobile radio stations MS are permitted to use that channel. The groups TP are the result of the subdivision of the total number of mobile radio stations MS located in the radio coverage area of the base radio station BS. The mobile radio station MS checks whether the group TP to which it belongs is allowed on this control channel CCH.

If these conditions are satisfied for a particular control channel the mobile radio station MS stores the content of the references RF and SC of that channel.

The references RF are stored so that at all times a number M of the most recent of such references are retained. This has the advantage that a record is only kept of the current state of the network. M can be small as the mobile radio station MS only stores one reference RF for each base radio station BS.

References MR concern the control channels CCH allocated to base radio station BS itself and are evaluated by the mobile radio station MS just like the references RF, i.e. the destination code (nat) and the group code (atp) are checked and stored in the same way. If a paging area code (pga) given in the reference MR does not correspond to the one stored in the mobile radio station MS, then the latter reroutes and stores the new paging zone code (pga). If the destination code (nat) or group code (atp) in the reference MR do not correspond on several occasions, then the mobile radio station MS will initiate a limited search.

The mobile radio station MS remains on a control channel CCH until such time as the channel's quality is no longer acceptable. The quality of a radio connection can be derived from a measurement of field strength and/or jitter. The mobile radio station MS makes this measurement and assigns a quality category to it.

2. Control channel selection

In order to ensure that the mobile radio station MS always receives a control channel CCH with acceptable quality, under certain conditions (after the mobile radio station MS is switched on, a decline in quality of the existing radio connection between the base radio station BS and the mobile radio station MS below a minimum level will result in a change in configuration on the basis of changes in references MR) a search for a control channel CCH should be initiated in the mobile radio station MS.

The mobile radio station MS will begin with a limited search. If this proves unsuccesful, it will be followed by an extended search.

2.1 Limited search

In the limited search the mobile radio station MS takes from a memory (the content of the memory is retained even after the mobile radio station MS has been switched off) the most recent state of the network and a synthesizer circuit therein scans the control channels CCH as follows:

Stored in the memory are M references RF (e.g. eight) and one reference MR. The quality of all these $M+1$ control channels ($M+1=9$) is measured (field strength and/or jitter measurement) during a first period TCCHTR (e.g. 5 ms) and a number of points are attributed in proportion to the quality. All the channels are assessed I times (e.g. 3) and then the mean number of points is taken. At this stage a list is compiled showing which channel has the highest number of points and so is the best channel. If a channel fails to reach a certain minimum number of points it is removed from the list. Then the best channel is monitored to see whether any control channel message is received during a second period TMRSUP (e.g. 300 ms). If the result of this test is negative then the next best channel is checked, until such time as the test has been made for all the channels on the list. If the test is positive then the mobile radio station MS selects this channel as the new control channel CCH and reports in or possibly reroutes. If the result of the test is not positive for any of the channels on the list then an extended search is initiated.

The following numerical example gives us the duration T for a limited search. This duration T can be found from the equation $$T=(M+1)\times I\times(t\text{ (synthesizer)}+TCCHTR),$$

in which t (synthesizer) stands for the time for which the synthesizer has been set. With M=8, I=3, t (synthesizer)=30 ms and TCCHTR=5 ms the result is that T=0.95 s.

Each measurement of each channel can be repeated at certain intervals TYSRF (e.g. after 5 s). It is also possible to make the number of points allocated dependent on the paging area. For example, all the control channels CCH belonging to the same paging area in which the mobile radio station MS has registered receive a bonus. This introduces a safeguard to prevent excessive rerouting by the mobile radio stations MS.

2.2. Extended search

The mobile radio station MS measures the quality of all the transmission channels in the frequency band of the radio transmission system that it can receive. In so doing the mobile radio station MS begins with transmission channel 1 and each time increases the frequency by 25 kHz until it reaches the transmission channel with the highest channel number, e.g. NCH=1000.

The quality is measured in the same way as in the limited search. Here too the mobile radio station MS measures each channel I times. Then the best channel is tested. The following conditions must be satisfied during this test:

Any control channel message must be received within the time TMRSUP.

The reference MR must be received within a time TMRCH (e.g. 5 s)

The channel number (frequency) transmitted in the reference MR must correspond to the frequency set on the synthesizer.

Destination code (nat).

Group code (atp).

If the result of this test is positive then the mobile radio station MS selects this channel as the new control channel CCH.

The following numerical example gives us the duration T of the extended search. This duration T can be found from the equation $$T=NCH\times I\times(t\text{(synthesizer)}+TCCHTR).$$

With NCH=1000, I=3, t (synthesizer)=15 ms and TCCHTR=5 ms the result is that T=60 s.

Compared with the limited search the t (synthesizer) is smaller, because steps of only 25 kHz are made.

2.3 Substitute channel test

Upon identifying a failure of a control channel CCH the mobile radio station MS carries out the following functional procedure.

The channel number (frequency) of the substitute channel CCH-SC given in the reference SC is set in the mobile radio station MS.

If any control channel message is received within the time TMRSUP then the mobile radio station MS selects this substitute channel CCH-SC as the new control channel CCH.

FIG. 1 shows a control system in accordance with the invention in the form of a block diagram. The base radio station BS contains a selection circuit AS which is connected to a switching device SE. The base radio station also contains a number of memories Sp1, only one of which, marked Sp1, is shown in the diagram, in which references RF to channel numbers ("cnr") allocated to control channels are stored. Also located in the base radio station BS are the memories SpM and SpSC which store references MR to the control channels CCH allocated to the base radio station BS and references SC to at least one substitute channel CCH-SC also allocated to it. If the references RF, MR or SC are to contain any other information besides the channel number (cnr), such as a destination code (nat) and/or a group code (atp) and/or a paging area code (pga), then the storage requirements will be greater. Such additional information can, however, lead to a reduction in search times. All these memories are connected to the switching device SE.

The switching device SE is controlled by the selection circuit AS and switches a communication signal N or references RF, MR or SC to a transmitter S located in the base radio station BS.

Located in the mobile radio station MS is a receiver E which receives the communication signal N or references RF, MR or SC from the transmitter S and feeds them to an evaluation circuit AWS. The evaluation circuit is connected to a selection circuit AMS.

The selection circuit AMS triggers a switching device SMS located in the mobile radio station MS. The switching device SMS is connected to a set of memories containing the memories SPM1, Smr and Ssc.

The reference RF, e.g. the channels numbers cnr, are read into the memory SPM1, a limited number of the channel numbers (cnr) most recently read in being stored at any one time. Stored in the memory Smr are the references MR to the control channels CCH allocated to the base radio station BS and stored in the memory Ssc the references SC to the substitute channels CCH-SC allocated to the base radio station BS.

What is claimed is:

1. A process for selecting a control channel for a mobile radio station (MS) in any zone of a radio communication system having a plurality of base radio stations respectively located in respective zones, communication between the mobile radio station (MS) and any of such base stations being effected over any of a plurality of communication channels which comprise at least one control channel allocated to each base station; such process comprising transmission by a base station (BS) at variable intervals of time, on each control channel allocated to it of references (RF) which identify the control channels (CCH) which are allocated to the other base stations; the content of each such reference (RF) being at least the channel number (cnr) of the control channel (CCH) identified thereby.

2. A process as in claim 1, wherein a plurality of control channels (CCH) are allocated to each base radio station (BS), such process further comprising transmission by a base radio station (BS) at variable intervals of time, of references (MR) which identify the control channels (CCH) allocated to it on each of such channels; the content of each reference (MR) being at least the channel number (cnr) of the corresponding control channel (CCH).

3. A process as in claim 2, wherein at least one substitute channel (CCH-SC) is allocated to each base radio station, such process further comprising transmission by a base radio station (BS) at variable intervals of time, on each of the control channels (CCH) allocated to it, of a reference (SC) which identifies the substitute channel (CCH-SC) allocated to it; the content of the reference (SC) being at least the channel number (cnr) of such substitute channel.

4. A process as in claim 3, further comprising transmission by base radio station (BS) of a destination code (nat), a group code (atp), and a paging area code (pga) in each of the references (RF, SC, MR).

5. A process as in claim 3, wherein the transmission by base radio station (BS) of references (RF) identifying other base station control channels, references (SC) identifying its own substitute channel (SC) and references (MR) identifying control channels allocated to itself is effected in a cyclically repeated fixed pattern of time intervals.

6. A process as in claim 5, wherein the mobile radio station (MS) stores the references (RF, SC, MR) transmitted by base radio station (BS).

7. A process as in claim 6, wherein the mobile radio station (MS) responds to the references (RF, SC, MR) stored therein by successively measuring the quality of each of the control channels (CCH) identified by such references, comparing the quality of each such channel with the quality of the control channel (CCH) to which reference was previously made, and depending on the result of such quality comparison communicating on the previous control channel (CCH) or communicating on the control channel (CCH) to which reference is then made.

8. A process as in claim 2, wherein a mobile radio station (MS) initiates a search for control channels (CCH) when it is initially turned on, when the quality of an existing control channel between a base radio station (BS) and the mobile radio station (MS) falls below a minimum level, and when the content of the reference (MR) identifying such an existing control channel no longer corresponds to such mobile radio station (MS).

9. A process as in claim 3, wherein the mobile radio station (MS) evaluates the quality of the substitute channel (CCH-SC) allocated to a base station (BS) when it identifies failure of a control channel (CCH) allocated to such base station (BS).

10. A process as in claim 3, wherein the substitute channel (CCH-SC) allocated to base station (BS) normally operates as a communication channel, and when a communication channel is not in operation it is allocated to base radio station (BS) as a control channel (CCH).

11. A process as in claim 7, wherein the mobile radio station (MS) measures the quality of the control channels (CCH) identified by the references stored therein at least I times during a time period (TCCHTR), awards to each such channel a number of quality points, derives the mean value of the I number of quality points, and stores a list of such mean values for the measured control channels (CCH).

12. A process as in claim 11, wherein the mobile radio station (MS) is allocated to the control channel (CCH) with the highest number of quality points, and after such allocation erases the list of mean values stored therein.

13. A process as in claim 12, wherein the mobile radio station (MS), beginning with the control channel (CCH) with the highest rating, determines whether any control channel message is transmitted on this channel during a predetermined time period (TMRSUP).

14. A process as in claim 11, wherein each measurement by the mobile radio station (MS) is repeated at predetermined intervals of time (TSRF).

15. A process as in claim 7, wherein the quality of a control channel (CCH) is derived by measurement of the field strength of transmission over such control channel, and assignment of a quality category to such transmission.

16. Apparatus for selecting a control channel in a mobile radio station (MS) of a radio transmission system having a plurality of base radio stations to each of which at least one control channel is allocated, apparatus comprising: a selection circuit (AS) located in a base radio station (BS) and which is connected to a switching device (SE) in such base radio station (BS); the base radio station (BS) having a memory (Sp1) in which is stored references (RF) identifying the channel numbers (cnr) allocated to control channels of other base radio stations, and memories (SpM) (SpSC) in which are respectively stored references (MR) identifying the control channel (CCH) allocated to the base radio station (BS) and references (SC) identifying a substitute control channel (CCH-SC) allocated to it; the switching device (SE) being controlled by the selection circuit (AS) to convey communication signals (N) and the references (RF) to a transmitter (S) located in the base radio station (BS); the mobile radio station (MS) comprising a receiver (E) which receives the communication signals (N) and references (RF) and conveys them to an evaluation circuit (AWS) connected to a selection circuit (AMS) further comprised in mobile radio station (MS); the selection circuit (AMS) triggering a switching device (SMS) also comprised in the mobile radio station (MS); the switching device (SMS) being controlled by the selection circuit (AMS) to read a set of memories (SPM1), (Smr) and (Ssc) also comprised in the mobile radio station (MS); the memory (SPM1) storing the channel numbers (cnr) of a limited number of the control channels (CCH), the memory (Smr) storing the references (MR) to the control channel (CCH) allocated to the base radio station (BS), and the memory (Ssc) storing the references (SC) to the substitute channel (CCH-SC) allocated to the base radio station (BS).

* * * * *